United States Patent
Li et al.

(10) Patent No.: US 11,373,101 B2
(45) Date of Patent: Jun. 28, 2022

(54) DOCUMENT ANALYZER

(71) Applicant: ACCENTURE GLOBAL SOLUTIONS LIMITED, Dublin (IE)

(72) Inventors: Chung-Sheng Li, San Jose, CA (US); Guanglei Xiong, Pleasanton, CA (US); Swati Tata, Bangalore (IN); Pratip Samanta, Bengaluru (IN); Madhura Shivaram, Bangalore (IN); Golnaz Ghasemiesfeh, Sunnyvale, CA (US); Giulio Cattozzo, Houston, TX (US); Lisa Blackwood, Houston, TX (US); Nagendra Kumar M R, Bangalore (IN); Priyanka Chowdhary, San Francisco, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1119 days.

(21) Appl. No.: 15/947,518

(22) Filed: Apr. 6, 2018

(65) Prior Publication Data

US 2019/0311271 A1    Oct. 10, 2019

(51) Int. Cl.
  *G06N 5/02*   (2006.01)
  *G06N 5/04*   (2006.01)
  *G06F 40/40*  (2020.01)
  *G06V 30/413* (2022.01)
  *G06V 30/414* (2022.01)

(52) U.S. Cl.
  CPC .............. *G06N 5/02* (2013.01); *G06F 40/40* (2020.01); *G06N 5/04* (2013.01); *G06V 30/413* (2022.01); *G06V 30/414* (2022.01)

(58) Field of Classification Search
  None
  See application file for complete search history.

(56) References Cited

U.S. PATENT DOCUMENTS

| 2005/0182657 A1 | 8/2005 | Abraham-Fuchs et al. |
| 2008/0320550 A1 | 12/2008 | Strassner et al. |
| 2010/0174754 A1 | 7/2010 | B'Far et al. |

OTHER PUBLICATIONS

Luca et al., "Ontology-Based Semantic Online Classification of Documents: Supporting Users in Searching the Web", Jan. 2004, 9 pages.
Doganata et al., "Authoring and deploying business policies dynamically for compliance monitoring", Jul. 2011, 9 pages.

*Primary Examiner* — Brian Whipple
(74) *Attorney, Agent, or Firm* — Mannava & Kang, P.C.

(57) ABSTRACT

Examples of analyzing documents are defined. In an example, a request to analyze a document may be received. A knowledge model corresponding to a guideline associated with the document may be obtained. The knowledge model may include at least one of a hypothetical question and a logical flow to determine an inference to the hypothetical question. The hypothetical question relates to an element of the guideline. Based on the knowledge model, data from the document may be extracted for analysis using an artificial intelligence (AI) component. The Ai component may be configured to extract and analyze data, based on the knowledge model. Based on the analysis, a report indicating whether the document falls within a purview of the guideline may be generated.

20 Claims, 8 Drawing Sheets

DOCUMENT ANALYZER

BACKGROUND

Generally, documents, such as, for example, transactional documents may form an integral part of an enterprise. The transactional documents may govern various tasks, operations, transactions, etc., between different businesses, between a business and a consumer, and between a business and a government. Such transactional documents are often required to be comprehended with respect to certain predefined policies, guidelines, or standards to perform a variety of tasks, such as, for example, for performing asset management directly from the transactional documents, reconciling invoices against the transactional documents, and the like.

Traditionally, the transactional documents may be managed by a system, which may perform functions, such as, for example, electronically storing the transactional documents in a database. However, such systems may fail to perform additional analysis, which may involve comprehending or reviewing the transactional documents, such as determining obligations of participating parties, revenue that would generated by the performance of an obligation, transfer of title, etc.

Moreover, often times, the policies such as rule based policies may be comprehensive, and reviewing of the transactional documents corresponding to such policies may be cumbersome, resource intensive, and error prone. Furthermore, since each transactional document may be specific to a domain, skilled labour may be required to perform analysis specific to each domain. The present disclosure provides a technical solution to a problem to efficiently and accurately assist systems in comprehending transactional documents.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes systems and methods for analyzing documents such as, for example, transactional documents with respect to predefined guidelines in an efficient and accurate manner. The predefined guidelines may be standards, policies, or rules defined for a domain, such as, for example, an international financial reporting standard (IFRS), which provides common global language for business operations so that company accounts are understandable and comparable across the globe. Therefore, organizations ensure that documents such as, for example, transactional documents adhere to these guidelines and the transactional documents are analyzed based on the guidelines. Further, the transactional documents may have to analyzed and comprehended continuously for a variety of reasons, such as, for example, for performing asset management directly from the transactional documents and reconciling invoices against contracts.

However, often times, the guidelines and the transactional documents may be comprehensive and involve complex language, thereby making analysis of the transactional documents with respect to the guidelines cumbersome, time consuming, and resource (computational and otherwise) intensive.

The present disclosure provides for efficient analysis of the guidelines, which in turn provides for efficient and accurate analysis of the transactional documents. In an example embodiment, a guideline analyzer may obtain a guideline to be analyzed. Upon analysis, element(s) of the guideline may be extracted. An element of a guideline may be understood as a process or a factor governing a core principle of the guideline. For example, for IFRS 15, which is a standard for guidance on accounting for revenue recognition from contracts with customers, extraction of elements may involve identifying a contract with a customer vs. with a business partner involving in kind arrangement; identifying performance obligations, such as need to deliver goods or services at a certain time to a certain location in a transactional document; determining transaction price, and other such elements, such as the existence of loss language and minimum guaranteed throughput.

Upon extracting the element, the guideline analyzer may determine knowledge model(s) defining the extracted element. The knowledge models may include, for example, hypothetical questions and logical flows to obtain an inference to the hypothetical questions. In one example, the knowledge models may be generated specific to an organization, a product category, etc. For example, the knowledge models may be used to describe for an organization dealing with non-gas liquid (NGL) products. Alternatively, the knowledge models may be defined generally, with variables, which may be adjusted for different organizations, products, and the like. The knowledge models for the guideline may be stored for further use. The knowledge models may be generated semi- or fully automatically using AI techniques and/or natural language processing techniques.

In an example, to analyze a transactional document, a document analyzer may determine a guideline corresponding to the transactional document. For example, a domain of the transactional document may be identified and a guideline governing transactional documents in the domain may be determined. For the determined guideline, corresponding knowledge models may be obtained. Based on the knowledge models, the document analyzer may extract and analyze data, referred to as knowledge data, from the transactional document.

The knowledge data may include relevant or key aspects of the transactional document on which analysis may generally be performed. The knowledge extraction and analysis may involve at least one of geo-spatial entity extraction, sentence similarity, supervised classification, search indices extraction, unsupervised clustering, topic detection, table extraction, entity and relationship extraction, and dependency parsing.

In addition to the knowledge models, case based data, may also be used for document analysis. The case based data often includes a case descriptor, which describes the key aspects of a case in the form of a vector. Other similar cases may be retrieved based on the similarity of the case descriptors of those cases. For example, this approach enables the analysis of another transactional document in the same domain.

The analysis may include, for example, ascertaining whether the transactional document falls within the purview of a guideline for a domain to which the transactional document belongs. Further, on receiving a user request to interpret an aspect of the transactional document, the document analyzer may also provide an interpretation of the aspect of the transactional document may be provided. The aspect may be, for example, to determine whether a transaction price is defined or whether a minimum transaction price is defined for a case when obligation is not met. The interpretation may also be provided based on the knowledge models and/or case based data, as discussed above.

Accordingly, the present system may intelligently process guidelines to generate knowledge models to efficiently capture relevant and key aspects. Furthermore, the system may then analyze various transactional documents, based on the knowledge models to accurately interpret the transactional documents. Because system may capture all relevant elements (processes and/or features) of a guideline and the subsequent analysis of a transactional document may be performed based on knowledge models corresponding to the elements, the analysis may be substantially free from errors. Furthermore, the extraction of relevant features and the use of appropriate knowledge models to automatically analyze documents may reduce the CPU (Central Processing Unit) cycles and memory required as opposed to conventional systems.

Additionally, because the knowledge models once generated may be used for a variety of transactional documents, time and resources may also be better utilized. Furthermore, the system may be configured to address amendments as and when they come to provide updated knowledge models, thereby ensuring that the transactional documents are analyzed as per latest guidelines, which may in turn help ensuring the accuracy of the analysis.

Thus, systems such as, for example, transaction management systems, which use techniques consistent with the present disclosure may accurately analyze the transactional documents in a time and resource efficient manner.

Figure 1:
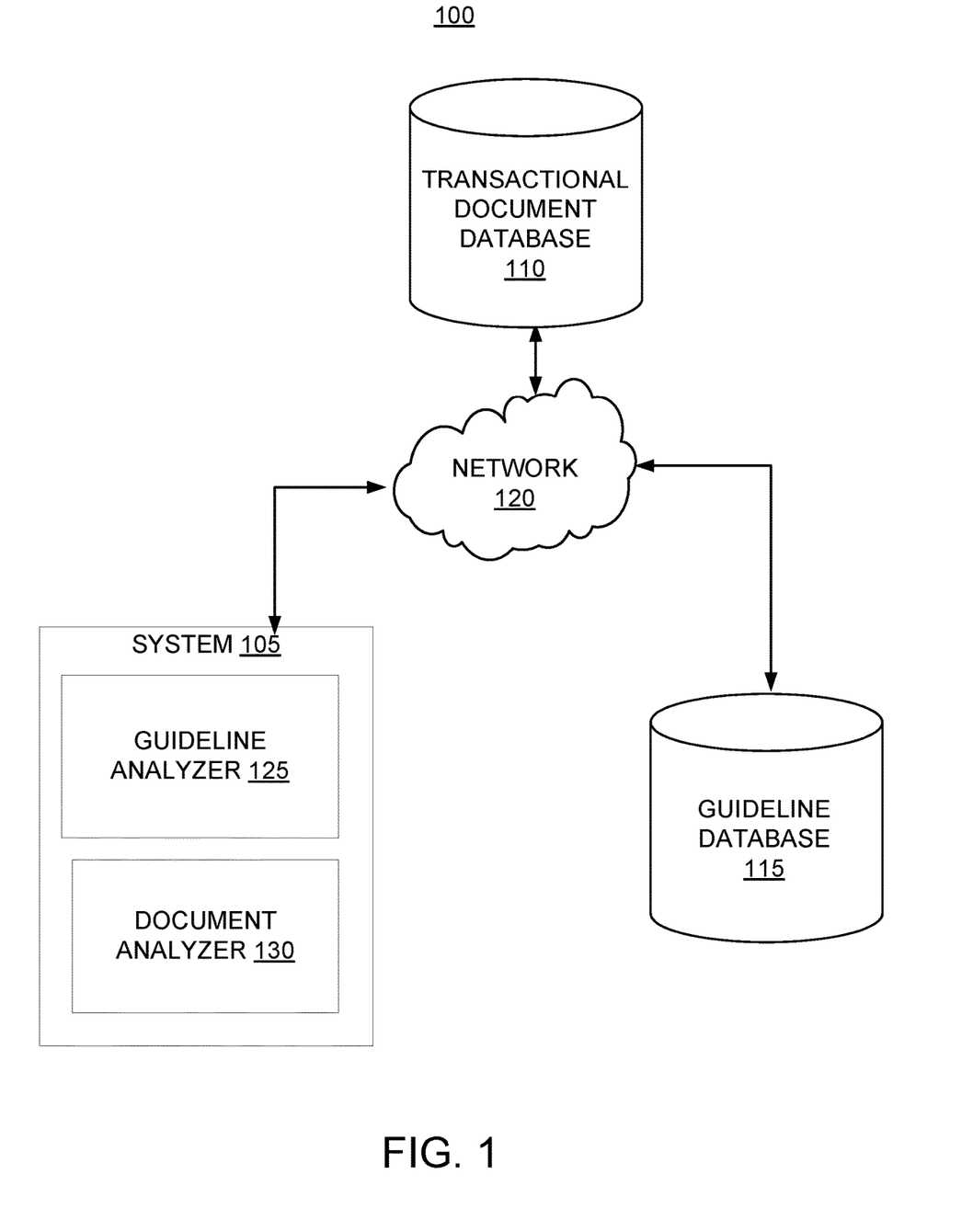
FIG. 1 illustrates a network environment implementing a document analysis system, according to an example embodiment of the present disclosure.

FIG. 1 illustrates a network environment 100 implementing a document analysis system 105, according to an example implementation of the present disclosure. In an example embodiment, the document analysis system 105 uses Artificial Intelligence (AI) techniques, such as machine learning, data mining, and knowledge discovery, for the purpose, of analyzing transactional documents and corresponding guidelines.

In an example embodiment, the network environment 100 may be a public network environment, including thousands of individual computers, laptops, various servers, such as blade servers, and other computing devices. In another example embodiment, the network environment 100 may be a private network environment with a limited number of computing devices, such as individual computers, servers, and laptops. Furthermore, the system 100 may be implemented in a variety of computing systems, such as a laptop, a tablet, and the like.

According to an example embodiment, the system 105 is communicatively coupled to with a transactional document database 110 and a guideline database 115 through a network 120. In another example, the transactional document database 110 and the guideline database 115 may be integrated with the system 105. The transactional document database 110 may store transactional documents of an organization and metadata pertaining to the transactional documents. The metadata may include, for example, date on which document was signed, details pertaining to negotiations, etc. The guideline database 115 may store data relating to guidelines, standards, policies, and rules defined for various domains.

In an example, the system 105 may retrieve guideline from a variety of sources, including third party sources, such as document repositories and other such information sources, data stores, and/or third party applications. The system 105 may further decompose and curate the existing guidelines into multiple knowledge representations, and store the data into the guideline database 115 for future representation, as is explained in detail later in description of FIG. 1. Further, the guideline database 115 may be periodically updated. For example, new data may be added into the guideline database 115, existing data in the guideline database 115 may be modified, or non-useful data may be deleted from the guideline database 115.

In an example embodiment, the network 120 may be wireless network, a wired network, or a combination thereof. The network 120 may also be an individual network or a collection of many such individual networks, interconnected with each other and functioning as a single large network, e.g., the Internet or an Intranet. The network 120 may be implemented as one of the different types of networks, such as Intranet, Local Area Network (LAN), Wide Area Network (WAN), the Internet, and the like. Further, the network 120 may include a variety of network devices, including routers, bridges, servers, computing devices, storage devices, and the like.

According to an example embodiment, the system 105 may include a guideline analyzer 125 and a document analyzer 130. The guideline analyzer 125 may analyze a guideline stored in the guideline database 115 to generate a knowledge model for each element of the guideline. It will be appreciated that the term guideline encompasses a guideline, a standard, a regulation, a policy, a rule, a principle, or the like. The guideline may provide guidance on how a document, such as a transactional document, should be defined to meet industry standards. In other words, the guidelines provide basic rules and principles in determining whether a transactional document falls under the purview of current regulations.

The guideline analyzer 125 may implement a variety of AI techniques for analyzing the guideline. In an example, the guideline analyzer 125 may obtain the guideline, such as, for example, IFRS 9 and IFRS 15, to be analyzed from the guideline database 115. Upon obtaining, the guideline analyzer 125 may extract an element central to the guideline. An element defines a concept, an aspect, a process, or a factor central to the core principle of the guideline. The guideline analyzer 125 may implement techniques, such as, for example, text mining techniques and ontology construction to extract the elements.

In an example, the guideline analyzer 125 may perform deep parsing (dependency parsing) of multiple transactional documents in a knowledge base or an ontology corresponding to a domain to identify entities and relationships therebetween, based on the frequencies of the relationships across the multiple-transactional documents.

Upon extracting the element, the guideline analyzer 125 may generate hypothetical questions and/or logical flows to obtain inferences to the hypothetical questions on analyzing a transactional document. Each knowledge model may provide a logic, which may help in determining whether the transactional document includes text corresponding to the element of the guideline. A hypothetical question may be related to the element of the guideline. The knowledge models for the guideline may be stored in the guideline database 115 for further use.

In an example, the guideline analyzer 125 may perform natural language processing tasks, such as, for example, topic modelling and clustering of sentences, words, or sample queries drawn from a guideline, which helps in identification of important topics/element pertaining to the guideline. For such topics/entities a knowledge model may be defined. For example, rule based approaches may be followed for generating logical flows for certain hypothetical questions. For example, semantic similarity may be performed for a training sample and semantic similarity may then be used to predict the answer to the question (pertaining to the guideline) to identify similar sentences, i.e., sentences that may be interpreted same as the training sample. Accordingly, a logical flow with questions with answers in affirmative/negative may be defined. The knowledge model generation is explained in detail with the help of an example with reference to description of FIG. 2.

In operation, a user may provide a request to review, analyze, or comprehend a transactional document. On receiving the request, the document analyzer 130 may obtain the transactional document to be analyzed, for example, from the transactional database 110. In one example, the document analyzer 130 may identify a domain of the transactional document to determine a guideline corresponding to the domain. In an example, the document analyzer 130 may identify the words in the document based on word-related statistics, such as, frequency counts and other statistics (tf-idfs, etc) to map the document to a particular domain or knowledge base. For the determined guideline, corresponding knowledge models may be obtained from the guideline database 115.

The document analyzer 130 may extract knowledge data from the transactional document to analyze the transactional document, based on the knowledge models. The knowledge data may include data defining features of the transactional document and data, which may be required for analysis with respect to the knowledge models. The document analyzer 130 may include various components (shown in FIG. 2) to perform knowledge extraction and analysis. For example, the document analyzer 130 may perform search indices construction, entity/relationship extraction, topic detection, sentence similarity search, geospatial entity extraction, dependency parsing to extract the parameters associated with the entities, table extraction, extraction of domain specific ontology, etc. The knowledge data may be stored in the transactional database 110.

The document analyzer 130 may then analyze the extracted knowledge data with respect to the knowledge models indicative of the guideline. Additionally, the document analyzer 130 may also analyze the knowledge data with respect to case based data (not shown in figures), which may be stored in the system 105 or separately in a database. The case based data may include details pertaining analysis of the transactional documents in the same domain. The knowledge from the analysis performed for a previous case (transactional document) may be used to intelligently analyze a present case.

Based on the analysis, the document analyzer 130 may ascertain whether the transactional document falls under the purview of the guideline regulating the transactional document and/or to provide an interpretation of an aspect of the transactional document. The details of the analysis of the transactional document are provided in subsequent paragraphs.

Figure 2:
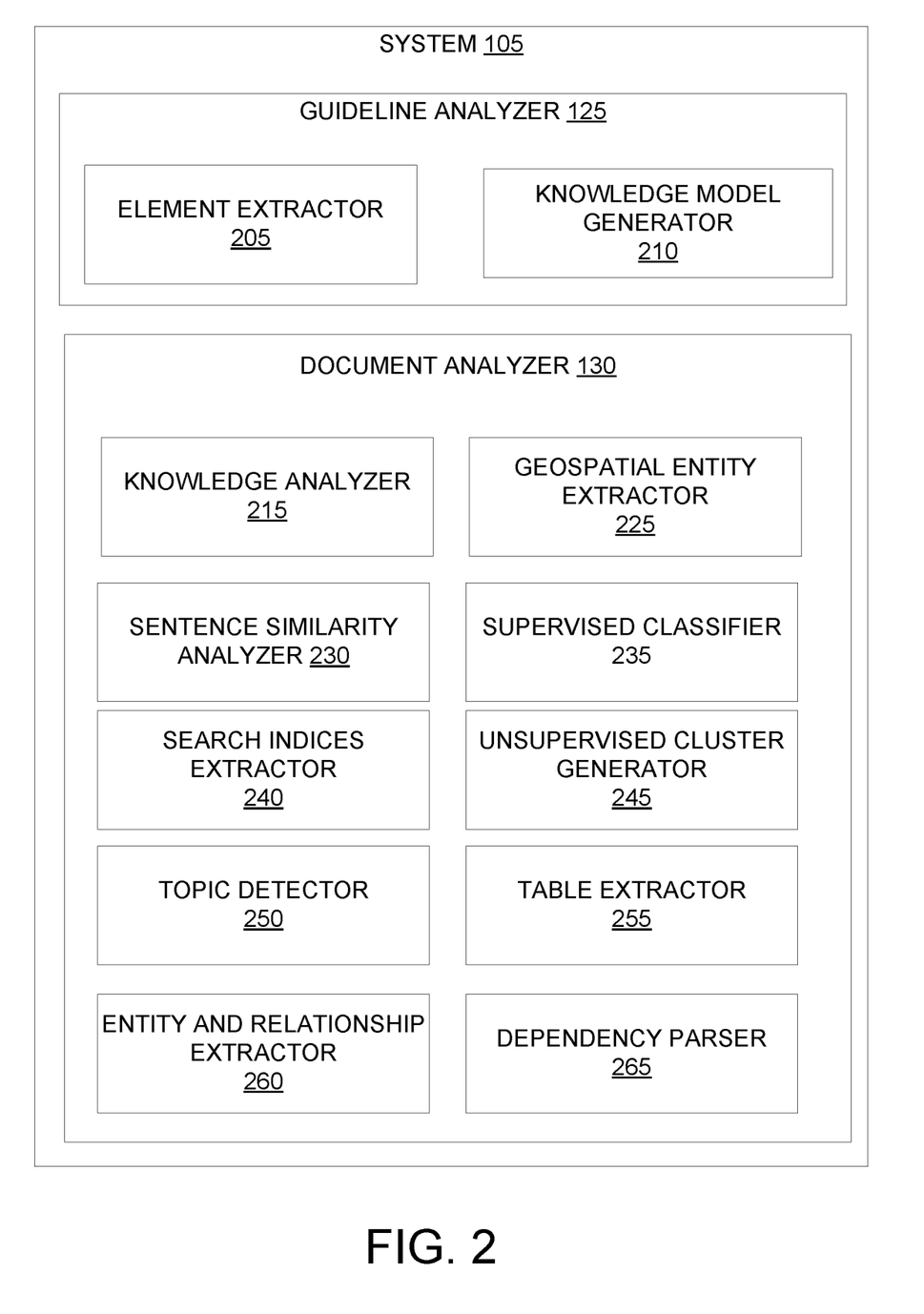
FIG. 2 illustrates various components of the document analysis system, according to an example embodiment of the present disclosure.

FIG. 2 illustrates various components of the system 105, according to an example implementation of the present disclosure. The functioning of the system 105 has been explained in detail with respect to IFRS 15; however it will be appreciated principles described may be applicable on other guidelines as well. As mentioned earlier, the system 105 may be in communication with various data sources, such as the transactional database 110, the guideline database 115, the case based data to obtain transactional documents, guidelines, knowledge models, and domain specific data for analysis.

In an example, the system 105 may include the guideline analyzer 125 and the document analyzer 130. The guideline analyzer 125 may include an element extractor 205 and a knowledge model generator 210. The document analyzer 130 may include a knowledge analyzer 215, and a variety of AI components, such as, for example, a geospatial entity extractor 225, a sentence similarity analyzer 230, a supervised classifier 235, a search indices extractor 240, an unsupervised cluster generator 245, a topic detector 250, a table extractor 255, an entity and relationship extractor 260, and a dependency parser 265.

In one example, the element extractor 205 may obtain a guideline from the guideline database 115. The element extractor 205 may periodically obtain new guidelines or may obtain a guideline on receiving a user input. The element extractor 205 on obtaining the guideline may extract an element of the guideline. As mentioned earlier, an element of a guideline may correspond to a process, a feature, a factor central to the core principle of the guideline. The element extractor 205 may implement AI techniques, such as, for example, text mining techniques, natural language processing techniques, etc., for element extraction.

For example, for IFRS 15, the core principle may be to recognize revenue to depict transfer of goods or services. Accordingly, the text of IFRS 15 may be analysed to identify following process as the element:
1. Identify a transaction with a customer
2. Identify performance obligations in the transaction
3. Determine a transaction price 4. Allocate the transaction price
5. Recognize revenue when (or as) a performance obligation is satisfied Thus, each transactional document, which is required to adhere to IFRS 15 needs to satisfy the process outlined above, i.e., each transactional document is to be in accordance with the element of the guideline. The element extractor 205 may store the element in the guideline database 115 or in the system 105.

Upon extracting the element, the knowledge model generator 210 may generate the knowledge model(s) corresponding to the element. In an example, the knowledge models may include hypothetical questions and for each hypothetical question, a flow chart/logic to determine an inference to the hypothetical question may be defined. In one example, the knowledge models may be generated specific to an organization, a product category, etc. Alternatively, the knowledge models may be defined generally, with variables, which may be adjusted for different organizations, products, and the like Referring to example of IFRS 15 above, hypothetical questions pertaining to the process for an organisation dealing in non-gas liquid (NGL) may be, for example, 1. Does title of the product pass to organization at delivery point?
2. Does title of product pass back to contract party anywhere?
3. Does contract party retain any products?
4. Does contract party take any in kind election?
5. If yes, take in kind for residue, for NGL, fee deduction for Transfer In Kind (TIK)?
6. Consideration paid to contract party based on proceeds from sales?
7. Is organization required to market products to specific party or market?
8. For organization, is there deduction for transportation fractionation and storage?
9. Does the contract party have the stated right to bypass the plant?
10. Is there risk of loss language in the contract?
11. Is there a guaranteed throughput volume?
12. If yes, does the contract contain deficiency fee terms?

The first six hypothetical questions may relate to an element, which corresponds to a process to adjudicate whether the transactional document falls under IFRS 15, and remaining hypothetical questions may relate to other elements, which may correspond to aspects, such as, for example, determining how transaction price was set and how transaction price is calculated, and is there any minimum transaction price to be paid, when obligation is not met.

Further, for each of the above-mentioned hypothetical questions, a flow chart may be defined to obtain an inference to the hypothetical question. Examples of flow charts are described with reference to description of FIG. 3a and FIG. 3b.

Thus, knowledge models for all the guidelines pertinent to an organization may be efficiently generated so that they may be used for analyzing transactional documents.

In an example, a user may provide a request to analyze, for instance, to interpret a transactional document in light of a corresponding guideline. On receiving such a request, the knowledge analyzer 215 may determine a guideline corresponding to the transactional document. The guideline may be determined, based on a domain to which the transactional document belongs. For example, a domain may be "revenue from contracts with customers". In said example, IFRS 15 may be identified as current regulation for contacts in said domain. Accordingly, the knowledge models corresponding to IFRS 15 may be obtained.

Based on the knowledge models, the knowledge analyzer 215 may extract the knowledge data from the transactional document to be analyzed. For example, based on the knowledge models, geo-spatial entities, tables, parties, titles, etc., may be obtained. The knowledge analyzer 215 may implement natural language processing techniques, text mining techniques, machine learning, etc., techniques to extract the knowledge data. Further, the knowledge analyzer 215 may configure one or more of the AI components to aid in knowledge extraction.

In an example, based on the user request, an ontology corresponding to a domain or a knowledge model corresponding to the user request may be queried to identify the AI components to be activated. In an example, from ontology corresponding to the knowledge model/domain, relevant AI components may be selected. For instance, for each domain, such data may be predefined; or there may be a pre-defined mapping which may indicate which AI component is to be activated and for what purpose. Accordingly, the knowledge analyzer 215 may refer to such predefined data/mapping for each domain ontology/knowledge model ontology to identify the AI components to be selected.

On determining the AI components to be configured, the knowledge analyzer 215 may refer another domain specific mapping to determine parameters to be set and the values of the parameters may be determined. Such mapping may also be derived from the ontology of the corresponding domain. Based on the determined values, corresponding parameters may be set for the AI component.

For example, if the result of querying the ontology indicates that it is to be determined if a particular relationship exists between two entities, then the knowledge analyzer may select a dependency parser and configure the same accordingly. To perform the configuration, the corresponding parameters may be set. Referring to the example of a dependency parser, parameters may be configured to indicate the entities of interest and the relationships between these entities that should be looked at.

Thus, the knowledge analyzer 215 may configure the AI components for extracting entity and relationships, for entity resolution, for searching indices, for dependency parsing, and for knowledge graph extraction, based on the knowledge models corresponding to the guideline. Accordingly, the AI components may be configured to perform, for example, sentence similarity, for terms defined in the logic flow in the knowledge model.

In an example, the entire corpus of documents can be analysed based on either the supervised classifier 235 or the unsupervised classifier 245 so that similar documents or paragraphs can be identified. In another example, the knowledge analyzer 215 may identify different sections and/or search indices of the transactional document, based on a semantic search. The knowledge analyser 215 may leverage the topic detector 250 to determine the purpose of a paragraph or a section. The transactional document may include various sections, such as 'parties', 'obligations', 'titles', 'revenue', 'geographical entities', or the like. The sections may form a basis for storing different types of information that is extracted from the transactional document. For the purpose, the knowledge analyzer 215 may implement the search indices extractor 240, which may aid identification of sections and search indices in the transactional document The knowledge analyzer 215 may also parse the transactional document to identify the participating parties, such as seller, the buyer, the intermediate entity, and the like. For example, a sentence similarity analyzer 230 may perform similarity based search may be performed to compare text of the transactional document with predetermined keywords, such as 'party', 'seller', 'buyer', 'retainer', or the like. Further, the knowledge analyzer 215 may determine the obligations associated with the identified parties. In an example, the knowledge analyzer 215 may implement the entity and relationship extractor 260, which may provide for identification of entities or parties and a relationship therebetween. In some cases, the dependency parser 265 may be triggered to establish the association between the parameter(s) and its value.

The knowledge analyzer 215 may also extract geospatial entities, for instance, to determine the location of parties, products, etc. In an example, the knowledge analyzer 215 may implement the geospatial entity extractor 225, which may extract geospatial information in the transactional document. The geospatial information may be included, for instance, in exhibits or annexures of the transactional documents. The geospatial entity extractor may analyze such sections as well to extract geospatial information. In an example, the geospatial information may appear in the form of, for example, latitude and longitude, when only the centroid is given, or may be specified in the form of a bounding box, when a rectangular region is given. Further, a legal description of land, such as, in the form of section, range, township, etc.; or survey, abstract, etc. may also appear in a document.

The geospatial information may be useful in contract reconciliation or jurisdiction related issues. The knowledge analyzer 215 may also extract tables, using a table extractor 255 in order to extract the descriptions of assets that are often listed in a document in the table format.

Further, using various AI components, the knowledge analyzer 215 may obtain counter-parties within the transactional document, obligations, pricing conditions, geo-spatial information, etc. In an example, the obligations may be captured in a knowledge graph. The knowledge graph may be constructed from obligations by performing information extraction of the entities and relationships from the obligations. The knowledge graph or inferencing rules may also capture pricing conditions and formulas. The knowledge graphs and/or inferencing rules may be stored in the knowledge data.

The extracted knowledge, i.e., the knowledge data may be stored in the transactional database 110, in the system 105, or in a separate knowledge base (not shown in figures). The knowledge data may be analyzed with respect to the knowledge models. In an example, the analysis includes ascertaining whether the transactional document falls within the purview of the guideline. As mentioned earlier, the knowledge models may include logic or flow charts to hypothetical questions corresponding to the guideline.

The knowledge data may be analyzed to determine an inference to a hypothetical question, based on the logic defined for the hypothetical question in the knowledge model. For example, based on the knowledge model it may be determined whether the contract party may retain products or does title of a portion of the product pass to organization at delivery point? For the sake of brevity, the knowledge models are not discussed in detail here and are described with help of examples with reference to description of FIGS. 3a and 3b.

In addition to knowledge models, the knowledge analyzer 230 may also use the case based data to analyze the knowledge data and thus, the transactional document.

Based on the inferences to the knowledge models, the knowledge analyzer 215 may provide a report indicating aspects, which may/may not be under the purview of the transactional document. Accordingly, even a complex and comprehensive transactional document may be easily and efficiently analyzed with accuracy. The report may be provided to the user through a user interface.

In another example, the user may provide a query pertaining to interpretation of an aspect of the transactional document. For example, the query may correspond to one of the knowledge models, such as, for example, whether the title of the product pass to the organization at delivery point. In said example, the knowledge analyzer 130, upon determining that the transactional document falls within the purview of the guideline, may extract relevant knowledge model and analyze the transactional document, as described above. The report may indicate an interpretation of the transactional document to answer a query of the user. For example, the user may have queried about a minimum transaction price to be paid, if obligation is not met.

Figure 3A:
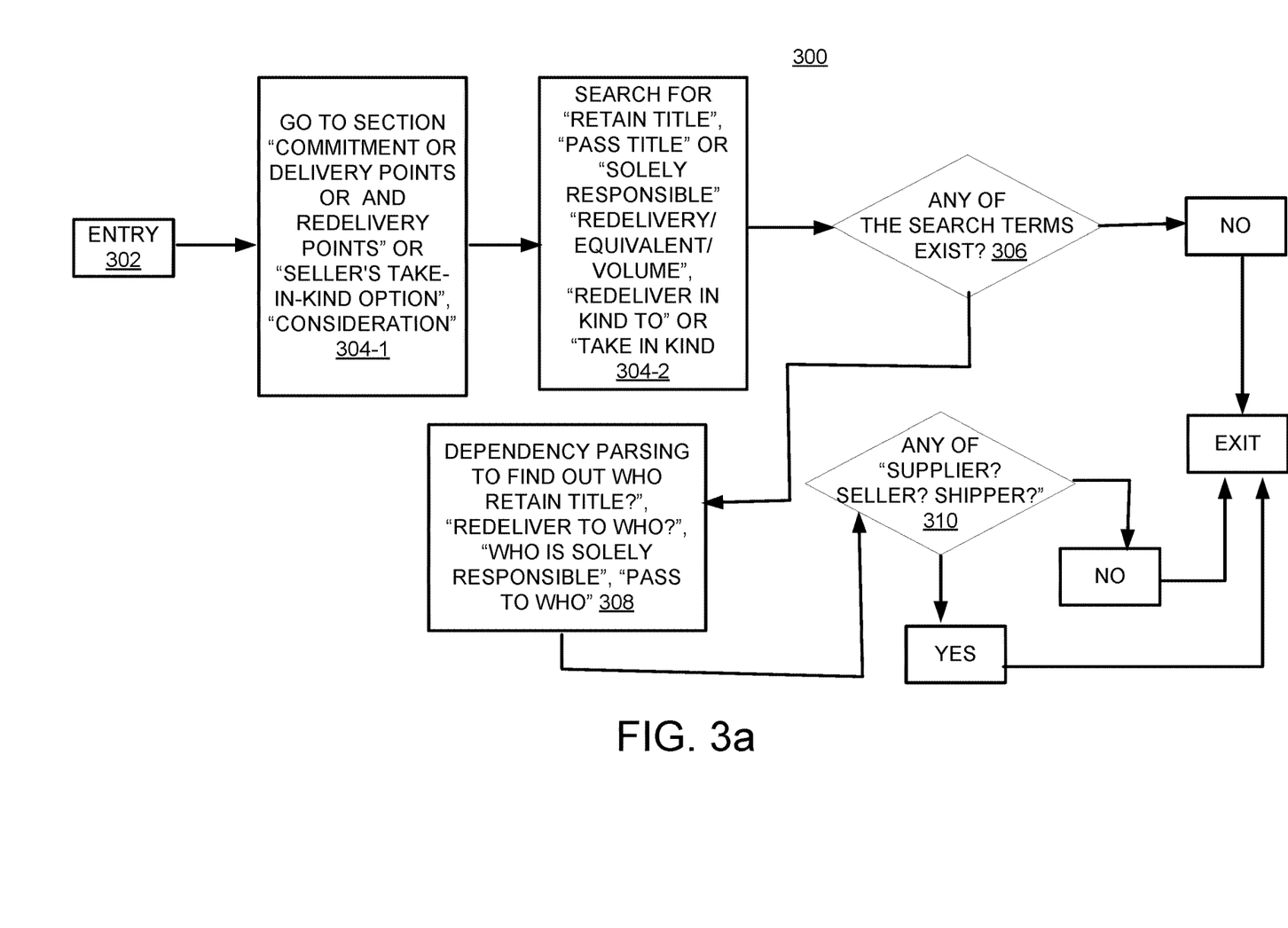
FIG. 3a illustrates an example of a knowledge model for analyzing a transactional document, according to an example embodiment of the present disclosure.
Figure 3B:
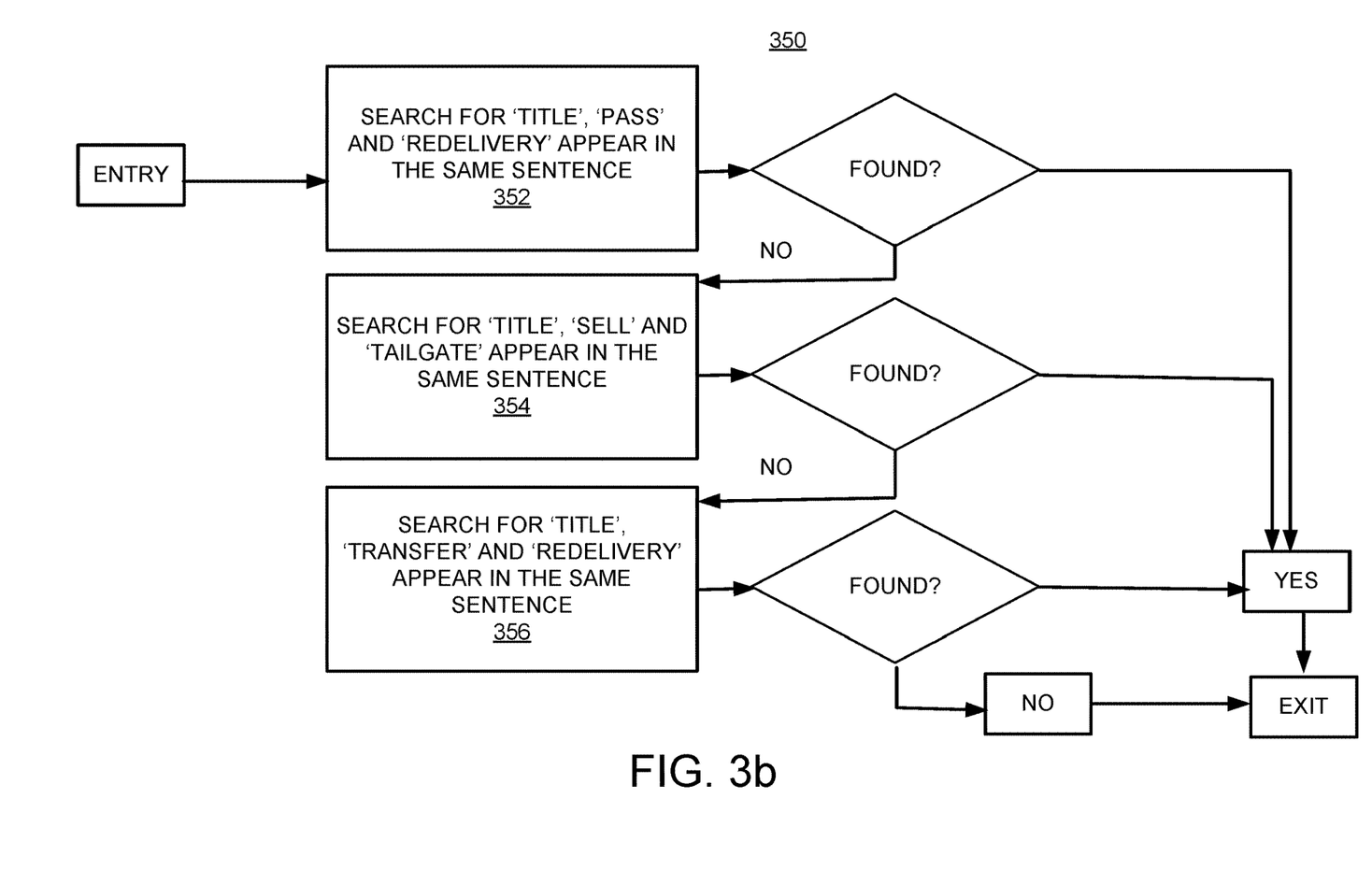
FIG. 3b illustrates an example of another knowledge model for analyzing the transactional document, according to an example embodiment of the present disclosure.

FIGS. 3a and 3b illustrate examples of the knowledge models 300 and 350 generated by the system 105 for IFRS 15, according to an example implementation of the present disclosure. The knowledge model for a guideline may include a hypothetical question and a logic to determine an inference to the hypothetical question. The knowledge model 300 corresponds to a hypothetical question—may the contract party retain any products?

The answers to each block in the knowledge model 300 may be determined, based on the knowledge data. At block 302, the logic may begin. At block 304-1, the knowledge analyzer 215 may be directed to go to section "commitment or delivery points or redelivery points" or "seller's take-in-kind option", or "consideration". At block 304-2, the knowledge analyzer 215 may be directed to search for terms "retain title", "pass title" or "solely responsible" "redelivery/equivalent/volume", "redeliver in kind to" or "take in kind".

At block 306, it may be determined any of the search terms exist. If the search terms do not exist, the knowledge analyzer 215 may exit the knowledge model 300. However, if the search term exist, at block 308, dependency parsing may be performed to determine answers to title related questions, such as "who retains title?", "redeliver to whom?", "who is solely responsible", "pass to who"? In an example, the knowledge analyzer 215 may implement the dependency parser 265 to determine if the search term exists.

At block 310, based on the parsing, it may be determined if any of a supplier, shipper, or a seller is identified? Based on a determination made at block 310, an inference, yes or no, may be made. Upon analysis, the knowledge analyzer 215 may exit.

Referring FIG. 3(b), the knowledge model 350 is illustrated, which provides a logic flow to determine an inference to a hypothetical question: does title of product pass to the organization at the tailgate?

At block 352, the knowledge analyzer 215 may search for terms, such as 'title', 'pass' and 'redelivery', and determine if the terms appear in the same sentence. Based on the determination, an inference may be determined. In an example, the knowledge analyzer 215 may implement the sentence similarity analyzer 230 to determine if the terms appear in the same sentence. If inference is negative, the knowledge analyzer 215 may proceed to next block.

At block 354, the knowledge analyzer 215 may search for terms 'title', 'sell' and 'tailgate', and determine if the terms appear in the same sentence. Based on the determination, an inference may be determined. If inference is negative, the knowledge analyzer 215 may proceed to next block.

At block 356, the knowledge analyzer 215 may search for terms title', 'transfer' and 'redelivery', and determine if the terms appear in the same sentence. Based on the determination, an inference may be determined, and the knowledge analyzer 215 may exit the knowledge model 350.

Figure 4:
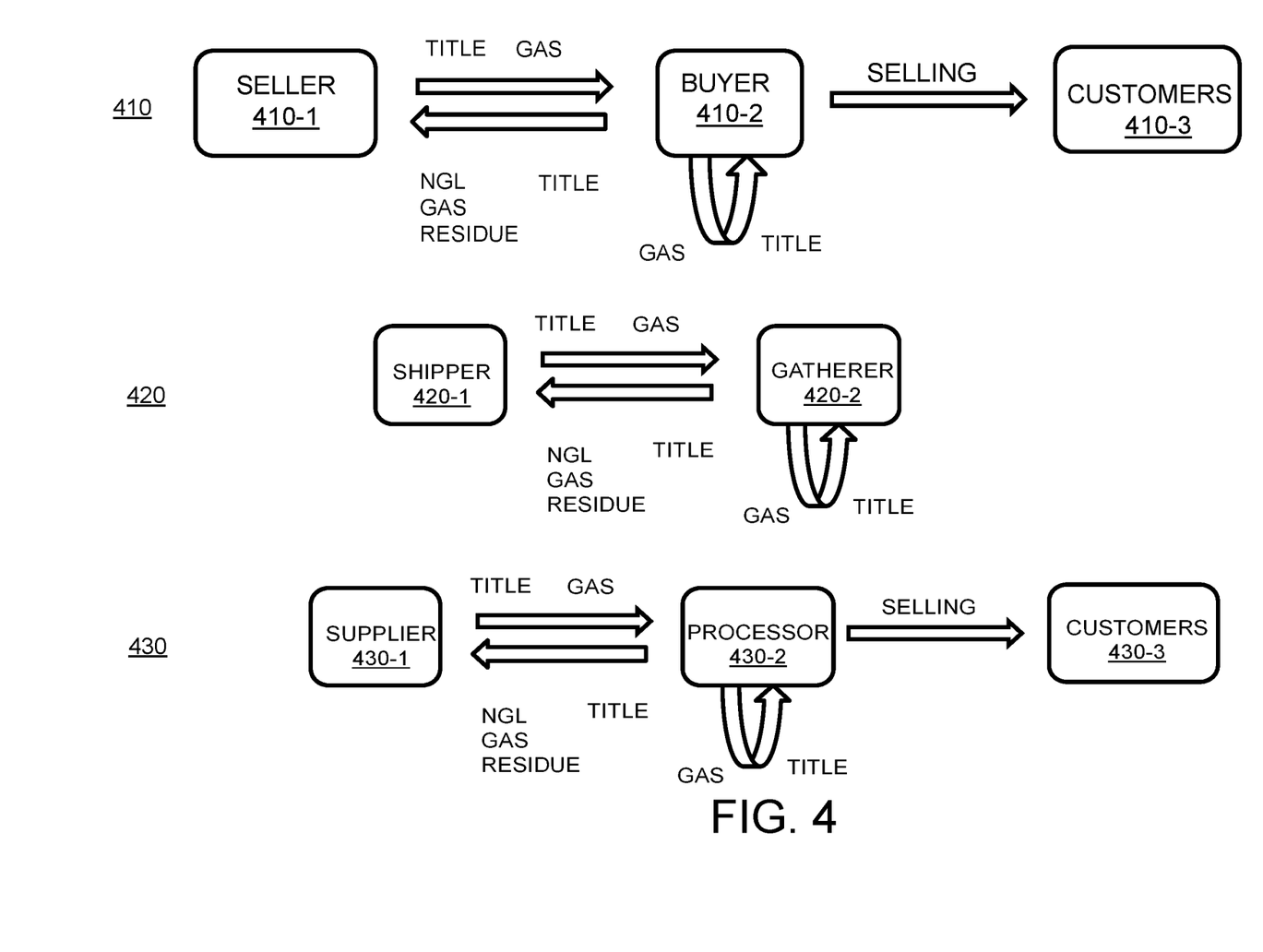
FIG. 4 illustrates an example depicting various transactional relationships between two parties, according to an example embodiment of the present disclosure.

FIG. 4 illustrates an example depicting various relationships between two parties, according to an example implementation of the present disclosure. FIG. 4 illustrates three types of contract, viz., a gas purchase contract 410, a gas gather contract 420, and a gas process contract 430. In each contract, role and obligations of an organization may change, thereby making it important to accurately determine titles and obligation of parties involved in a contract.

Referring to the gas purchase contract 410, a seller 410-1 may sell gas to a buyer 410-2, who in turn may sell it to customers 410-3. In this case, the organization may be the buyer 450. In this case, the organization (buyer 410-2) would get raw gas, process the gas, and sell the processed gas to the customer.

Referring to the gas gather contract 420, a shipper 420-1 may ship gas to an organization, who may now be a gatherer 420-2. In this case, there is no end customer, and the role of the organization may be that of a gatherer.

Referring to the gas process contract 430, a supplier 430-1 may provide gas to a processor 430-2, who may process gas and sell it to customers 430-3.

Thus, for the same organization and same domain, there may be multiple contracts and thus the transactional documents. Each such transactional document may have to be comprehended accurately to perform various tasks, such as revenue generation.

Figure 5:
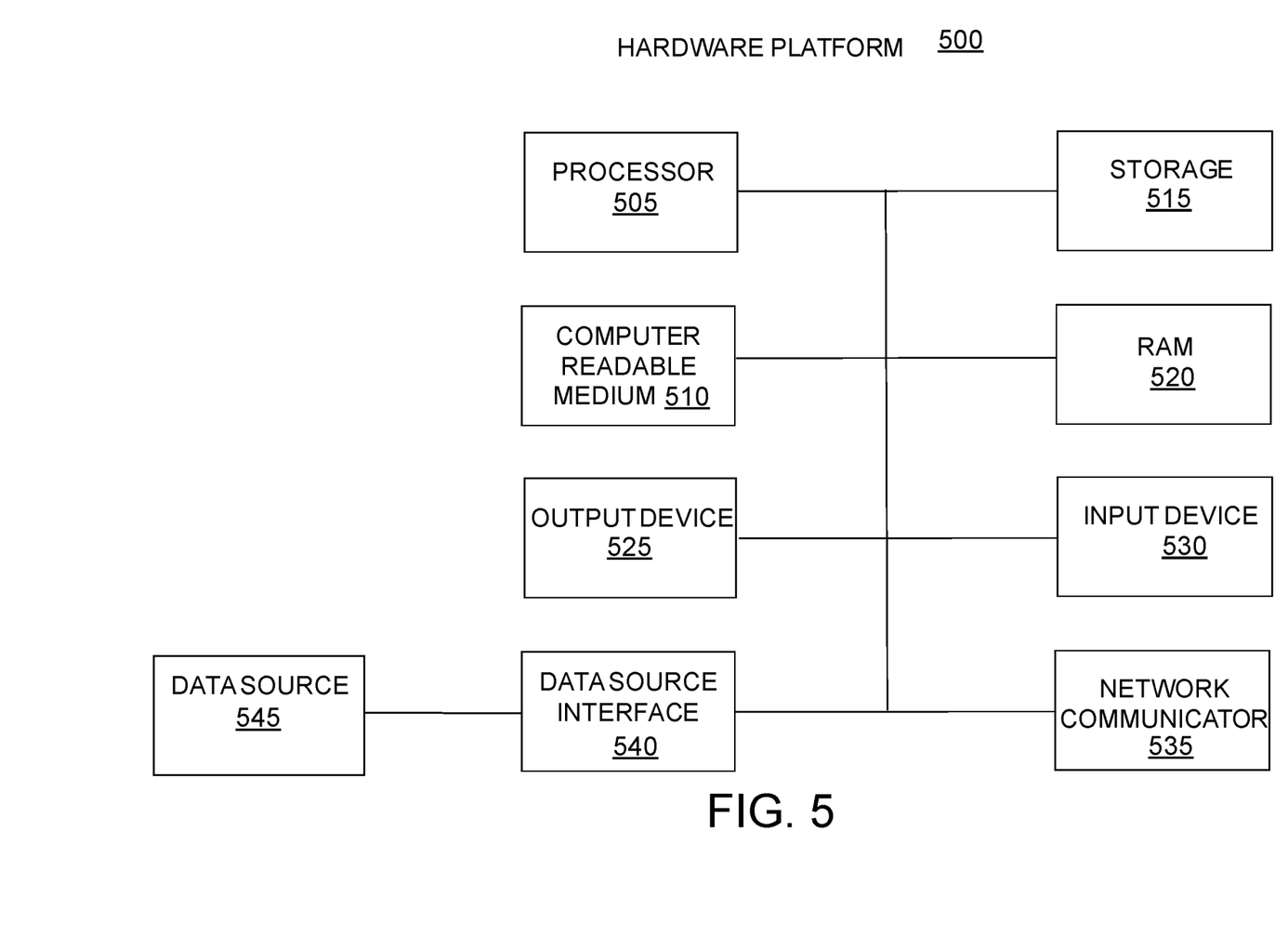
FIG. 5 illustrates a hardware platform for implementation of the system, according to an example embodiment of the present disclosure.

FIG. 5 illustrates a hardware platform for implementation of the system 105, according to an example embodiment of the present disclosure. Particularly, computing machines such as but not limited to internal/external server clusters, quantum computers, desktops, laptops, smartphones, tablets and wearables which may be used to execute the system 105 or may have the structure of the hardware platform 500. The hardware platform 500 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over the FIG. 5, the hardware platform 500 may be a computer system 500 that may be used with the examples described herein. The computer system 500 may represent a computational platform that includes components that may be in a server or another computer system. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 500 may include a processor 505 that executes software instructions or code stored on a non-transitory computer readable storage medium 510 to perform methods of the present disclosure. The software code includes, for example, instructions to gather data and documents and analyze documents. In an example, the guideline analyzer 125 and the document analyzer 130 are software codes or components performing these steps.

The instructions on the computer readable storage medium 510 are read and stored the instructions in storage 515 or in random access memory (RAM) 520. The storage 515 provides a large space for keeping static data where at least some instructions could be stored for later execution. The stored instructions may be further compiled to generate other representations of the instructions and dynamically stored in the RAM 520. The processor 505 reads instructions from the RAM 520 and performs actions as instructed.

The computer system 500 further includes an output device 525 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 500 further includes input device 530 to provide a user or another device with mechanisms for entering data and/or otherwise interact with the computer system 500. The input device may include, for example, a keyboard, a keypad, a mouse, or a touchscreen. In an example, output of the document analyzer 130 is displayed on the output device 525. Each of these output devices 525 and input devices 530 could be joined by one or more additional peripherals.

A network communicator 535 may be provided to connect the computer system 500 to a network and in turn to other devices connected to the network including other clients, servers, data stores, and interfaces, for instance. A network communicator 535 may include, for example, a network adapter such as a LAN adapter or a wireless adapter. The computer system 500 includes a data source interface 540 to access data source 545. A data source is an information resource. As an example, a database of exceptions and rules may be a data source. Moreover, knowledge repositories and curated data may be other examples of data sources.

Figure 6:
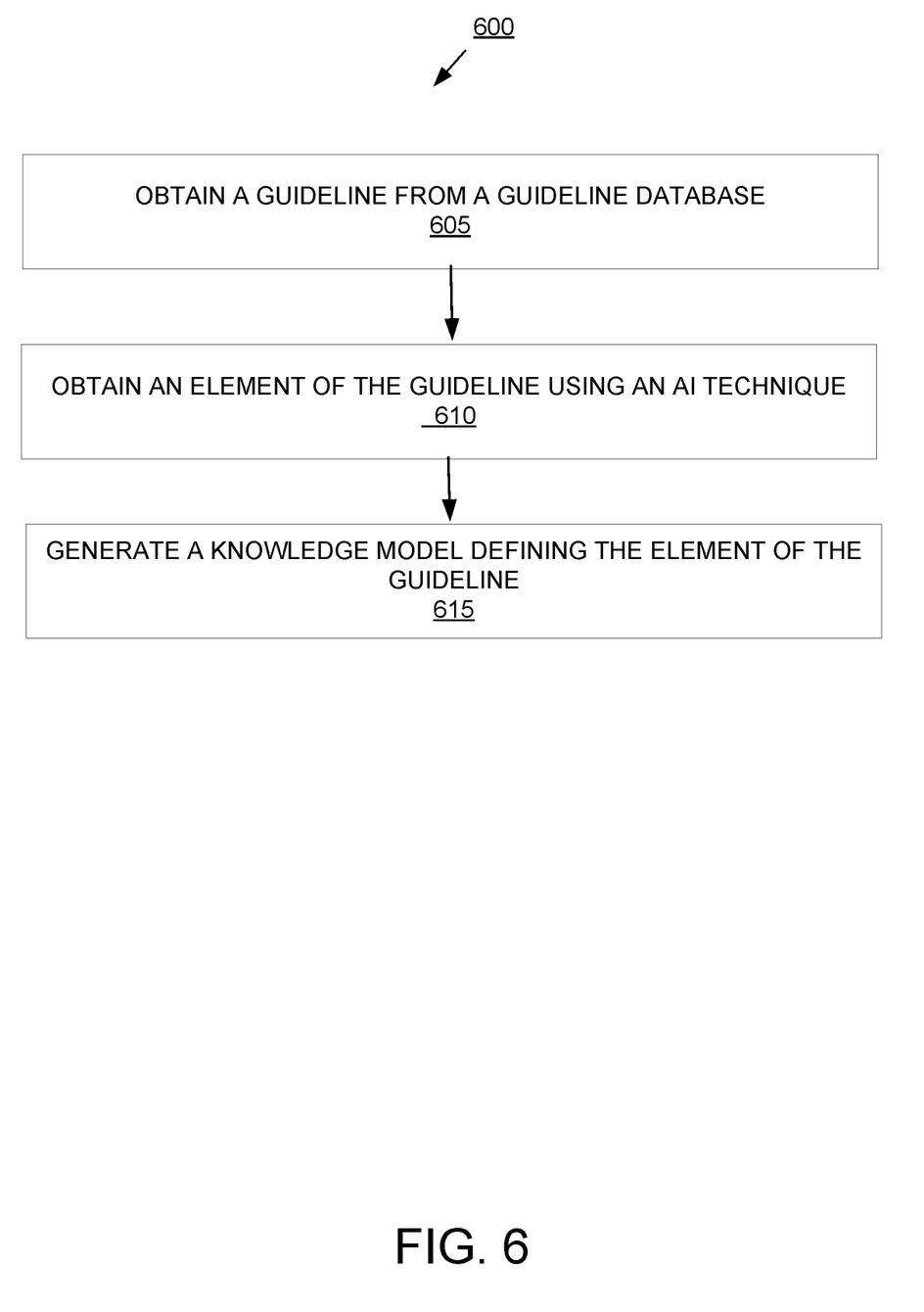
FIG. 6 illustrates a method for generating a knowledge model(s) corresponding to a guideline for analyzing a transactional document, according to an example embodiment of the present subject matter.
Figure 7:
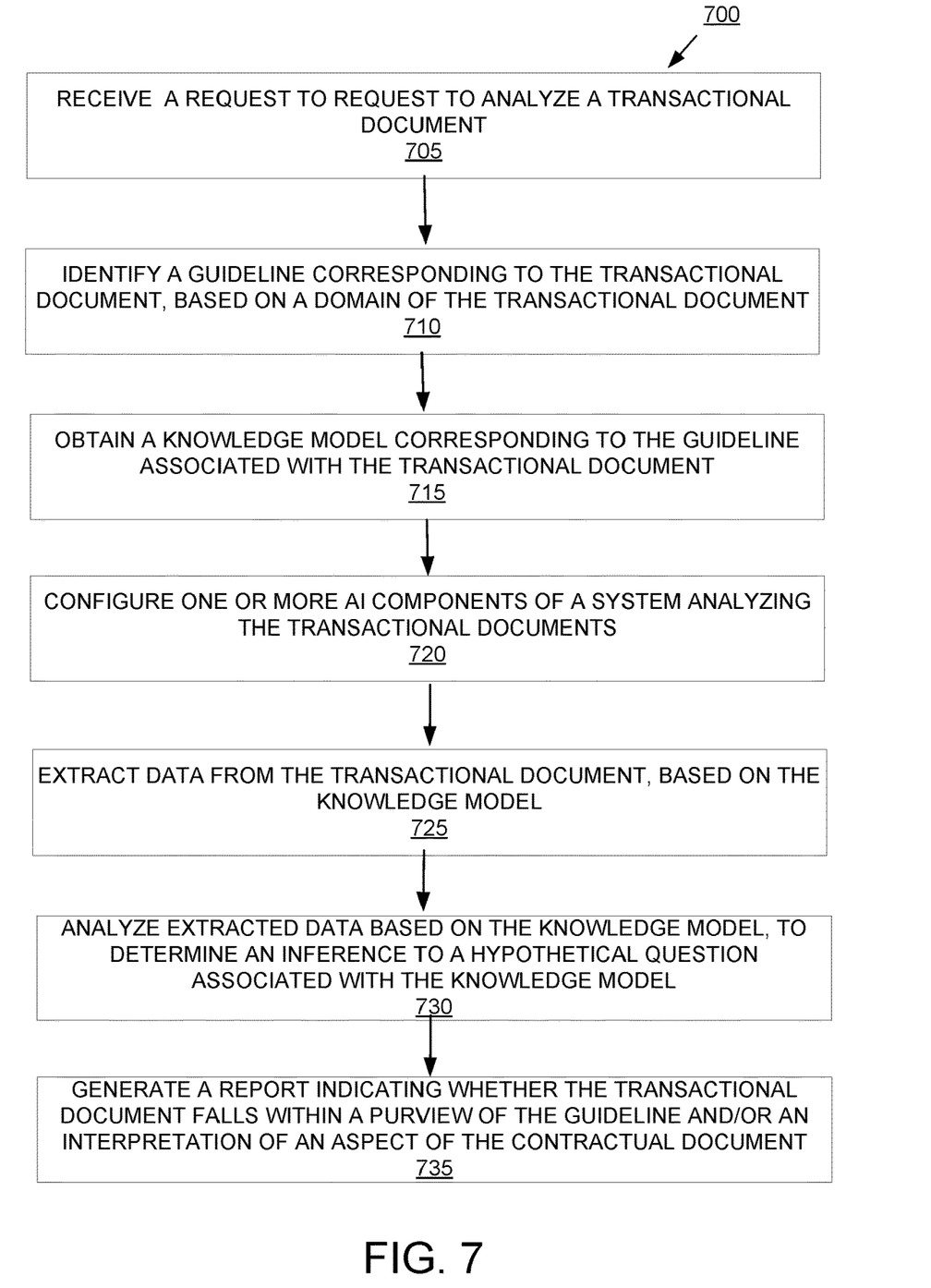
FIG. 7 illustrates a method for analyzing the transactional document, according to an example embodiment of the present subject matter.

FIG. 6 shows a method 600 for generating knowledge models corresponding to a guideline and FIG. 7 shows a method 700 for analyzing transactional documents, according to the present disclosure. It should be understood that method steps are shown here for reference only and other combination of the steps may be possible. Further, the methods 600 and 700 may contain some steps in addition to the steps shown in the FIG. 6 and FIG. 7, respectively. For the sake of brevity, construction and operational features of the system 105 which are explained in detail in the description of FIG. 1, FIG. 2, FIG. 3, and FIG. 5 are not explained in detail in the description of FIG. 6 and FIG. 7. The method 600 may be performed by a component of the system 105, such as the guideline analyzer 125 and the method 700 may be performed by the document analyzer 130.

At block 605, a guideline may be obtained from a guideline database. In an example, the element extractor 205 of the guideline analyzer 125 may obtain the guideline from the guideline database 115. The guideline may correspond to regulations defined for transactional documents in a domain. For example, IFRS 15, which is defined for revenue from contracts with customers and IFRS 16, which is for lease compliance.

At block 610, an element of the guideline may be obtained using the AI technique. The element may relate to a process outlined by the guideline and/or a factor governing a core principle of the guideline. In an example, the element extractor 205 may extract the element.

At block 615, a knowledge model defining the element of the guideline using one of the AI technique and a natural language processing technique may be generated. The knowledge model may include at least one of a hypothetical question and a logical flow to determine an inference to the hypothetical question. The hypothetical question relates to the element of the guideline. In an example, the knowledge model generator 210 of the guideline analyzer 125 may generate the knowledge models. In an example, the hypothetical questions may providing for determining whether a transactional documents falls within the purview of the guideline or provides for interpreting an aspect of the transactional document, such as, for example, how a transaction price is calculated.

Referring to method 700, at block 705, a request to analyze a transactional document may be received. The request may be to analyze the transactional document as a whole or only a portion/aspect of the transactional document. In an example, the user may provide the transactional document or the document analyzer 130 may obtain the transactional document from the transactional document database 110.

At block 710, the guideline corresponding to the transactional document, based on a domain of the transactional document, may be identified. As mentioned earlier, for each domain, there may be a predefined guideline. Thus, in case the transactional document pertains to lease compliance, IFRS 16 may be identified as the guideline.

At block 715, a knowledge model corresponding to the guideline associated with the transactional document may be obtained. In an example, the knowledge model may be obtained from the guideline database 115.

At block 720, one or more AI components of a system analyzing the transactional documents may be configured, based on an ontology corresponding to a domain of the guideline. The ontologies and corresponding data may be predefined for each domain and/or guideline. Based on the ontology the AI components relevant for processing the document as per the knowledge model(s)/guidelines may be selected. Upon selection, various parameters may be set using the ontology to configure the AI components for processing the document as per the guideline/knowledge model. The AI components may perform AI tasks, such as, for example, extracting geospatial entity, performing sentence similarity, performing supervised classification, extracting search indices, performing unsupervised clustering, detecting topics, extracting tables, extracting entities and relationship therebetween, and performing dependency parsing.

At block 725, based on the knowledge model, data from the transactional document may be extracted using configured AI component.

At block 730, extracted data may be analyzed, based on the knowledge model, to determine an inference to a hypothetical question associated with the knowledge model. The inference may be determined using a logic defined by the knowledge model. In an example, the document analyzer 130 may use the configured AI component to analyze extracted data.

At block 735, based on the analysis, a report may be generated indicating whether the transactional document falls within a purview of the guideline. In an example, where the user has requested for analysis pertaining to an aspect of the transactional document, the report may indicate, interpretation of the aspect.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor; and
   a document analyzer coupled to the processor, the document analyzer to,
   receive a request to analyze a document;
   obtain a knowledge model corresponding to a guideline associated with the document, the knowledge model including at least one of a hypothetical question and a logical flow to determine an inference to the hypothetical question, wherein the hypothetical question relates to an element of the guideline;
   based on an ontology corresponding to a domain of the guideline, select and configure an artificial intelligence (AI) component from a plurality of AI components, the AI component being one of a geospatial entity extractor, a sentence similarity analyzer, a supervised classifier, a search indices extractor, an unsupervised cluster generator, a topic detector, a table extractor, an entity and relationship extractor, and a dependency parser;
   implement the configured AI component to extract data from the document and analyze data, based on the knowledge model indicative of the guideline; and
   based on the analysis, generate a report, the report being indicative of at least one of:
   whether the document falls within a purview of the guideline; and
   an interpretation of an aspect of the document, as requested by a user.

2. The system as claimed in claim 1, wherein the system further comprises a guideline analyzer coupled to the processor, the guideline analyzer to generate the knowledge model corresponding to the guideline using an AI technique.

3. The system as claimed in claim 2, wherein the guideline analyzer further comprises an element extractor to:
   obtain the guideline from a guideline database, the guideline corresponding to regulations defined for documents in the domain; and
   extract the element of the guideline using the AI technique, the element relating to one of a process outlined by the guideline and a factor governing a core principle of the guideline.

4. The system as claimed in claim 2, wherein the guideline analyzer further comprises a knowledge model generator to determine the knowledge model defining the element of the guideline using one of the AI technique and a natural language processing technique, the element relating to one of a process outlined by the guideline and a factor governing a core principle of the guideline.

5. The system as claimed in claim 1, wherein the document analyzer is to identify words in the document based on a word-related statistic to determine the domain corresponding to the document.

6. The system as claimed in claim 1, wherein the document analyzer comprises a knowledge analyzer to identify the guideline corresponding to the document, based on the domain of the document.

7. The system as claimed in claim 1, wherein the document analyzer comprises a knowledge analyzer, the knowledge analyzer to determine a parameter and a corresponding value of the parameter, based on the ontology of the domain of the guideline, to configure the AI component.

8. A computer-implemented method, executed by at least one processor, the method comprising:
 receiving a request to analyze a document;
 obtaining a knowledge model corresponding to a guideline associated with the document, the knowledge model including at least one of a hypothetical question and a logical flow to determine an inference to the hypothetical question, wherein the hypothetical question relates to an element of the guideline;
 based on an ontology corresponding to a domain of the guideline, configuring an artificial intelligence (AI) component from a plurality of AI components, the AI component being one of a geospatial entity extractor, a sentence similarity analyzer, a supervised classifier, a search indices extractor, an unsupervised cluster generator, a topic detector, a table extractor, an entity and relationship extractor, and a dependency parser;
 implementing the configured AI component to extract data from the document and analyze data, based on the knowledge model indicative of the guideline; and
 based on the analysis, generating a report, the report being indicative of at least of,
  whether the document falls within a purview of the guideline; and
  an interpretation of an aspect of the document, as requested by a user.

9. The computer implemented method of claim 8, wherein the method comprises generating the knowledge model corresponding to the guideline using an AI technique.

10. The computer implemented method of claim 9, wherein generating the knowledge models comprises:
 obtaining the guideline from a guideline database, the guideline corresponding to regulations defined for documents in the domain; and
 extracting the element of the guideline using the AI technique, the element relating to one of a process outlined by the guideline and a factor governing a core principle of the guideline.

11. The computer implemented method of claim 9, wherein generating the knowledge models comprises determining the knowledge model defining the element of the guideline using one of the AI technique and a natural language processing technique, the element relating to one of a process outlined by the guideline and a factor governing a core principle of the guideline.

12. The computer implemented method of claim 8, wherein the method further comprises analyzing the extracted data, based on the knowledge model to provide the inference to the hypothetical question corresponding to the knowledge model.

13. The computer implemented method of claim 8, wherein configuring the AI component comprises determining a parameter to be configured and a corresponding value of the parameter, based on the ontology of the domain of guideline, to configure the AI component.

14. The computer implemented method as claimed in claim 8, wherein the obtaining further comprises:
 identifying words in the document based on a word-related statistic to determine the domain corresponding to the document; and
 identifying the guideline corresponding to the document, based on the domain of the document.

15. A non-transitory computer readable medium including machine readable instructions that are executable by a processor to:
 receive a request to analyze a document;
 obtain a knowledge model corresponding to a guideline associated with the document, the knowledge model including at least one of a hypothetical question and a logical flow to determine an inference to the hypothetical question, wherein the hypothetical question relates to an element of the guideline;
 based on an ontology corresponding to a domain of the guideline, configure an artificial intelligence (AI) component from a plurality of AI components, the AI component being one of a geospatial entity extractor, a sentence similarity analyzer, a supervised classifier, a search indices extractor, an unsupervised cluster generator, a topic detector, a table extractor, an entity and relationship extractor, and a dependency parser;
 implementing the configured AI component to extract data from the document and analyze data, based on the knowledge model indicative of the guideline; and
 based on the analysis, generate a report, the report being indicative of at least of,
  whether the document falls within a purview of the guideline; and
  an interpretation of an aspect of the document, as requested by a user.

16. The non-transitory computer readable medium as claimed in claim 15, further including instructions executable by the processor to generate the knowledge model corresponding to the guideline using an AI technique.

17. The non-transitory computer readable medium as claimed in claim 15, wherein to generate the knowledge model, the processor is to:
 obtain the guideline from a guideline database, the guideline corresponding to regulations defined for documents in the domain;
 extract the element of the guideline using the AI technique, the element relating to one of a process outlined by the guideline and a factor governing a core principle of the guideline; and
 determine the knowledge model defining the element of the guideline using one of the AI technique and a natural language processing technique.

18. The non-transitory computer readable medium as claimed in claim 15, wherein to generate the report, the processor is to analyze the extracted data, based on the knowledge model to provide the inference to the hypothetical question corresponding to the knowledge model.

19. The non-transitory computer readable medium as claimed in claim 15, wherein to configure the AI component, the processor is to determine a parameter to be configured and a corresponding value of the parameter, based on the ontology of the domain corresponding to the guideline.

20. The non-transitory computer readable medium as claimed in claim 15, wherein the processor is to
 identify words in the document based on a word-related statistic to determine the domain corresponding to the document; and
 identify the guideline corresponding to the document, based on the domain of the document.

\* \* \* \* \*